US009066294B2

(12) United States Patent
Moreno et al.

(10) Patent No.: US 9,066,294 B2
(45) Date of Patent: Jun. 23, 2015

(54) REAL TIME EVENT-DRIVEN AUTOMATION FOR ENERGY MANAGEMENT IN A WIRELESS NETWORK

(75) Inventors: Salvador Pedraza Moreno, Malaga (ES); Juan Ramiro Moreno, Malaga (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 543 days.

(21) Appl. No.: 13/005,969

(22) Filed: Jan. 13, 2011

(65) Prior Publication Data

US 2011/0183704 A1 Jul. 28, 2011

Related U.S. Application Data

(60) Provisional application No. 61/294,660, filed on Jan. 13, 2010.

(51) Int. Cl.
*H04B 7/00* (2006.01)
*H04W 52/02* (2009.01)
*H04W 88/08* (2009.01)

(52) U.S. Cl.
CPC ...... *H04W 52/0229* (2013.01); *H04W 52/0274* (2013.01); *H04W 88/08* (2013.01)

(58) Field of Classification Search
CPC ... H04W 72/02; H04W 52/386; H04W 72/04; H04W 72/0453; H04W 72/0473; H04W 84/045; H04W 36/0072; H04W 52/02; H04W 52/0274; H04W 52/028; H04W 76/027
USPC .................. 455/522, 69; 370/328, 310.2, 318
See application file for complete search history.

(56) References Cited

U.S. PATENT DOCUMENTS

| 6,418,322 | B1 * | 7/2002 | Kim et al. ...................... 455/522 |
| 6,584,330 | B1 * | 6/2003 | Ruuska .......................... 455/574 |
| 6,985,439 | B2 * | 1/2006 | Hosein .......................... 370/230 |
| 7,483,709 | B2 * | 1/2009 | Kondo ........................... 455/522 |
| 8,126,496 | B2 * | 2/2012 | Brisebois et al. ............. 455/522 |
| 8,644,273 | B2 * | 2/2014 | Choi et al. ..................... 370/338 |

(Continued)

OTHER PUBLICATIONS

Huawei et al., "Discussion on Gradually Cell Switch off/on" 3GPP TSG-RAN WG3#65bis, Japan, Oct. 2009, pp. 1-3.*

(Continued)

*Primary Examiner* — Nay A Maung
*Assistant Examiner* — Angelica M Perez

(57) ABSTRACT

Technologies are described herein for real time event-driven automation of energy management features within a wireless communications network. Resources within a wireless communications network, such as entire base stations or equipment within a base station supporting specific cells, sectors, frequency bands, or services, may be switched on or off in response to events occurring within the communications network. A central controller receives a network interface message corresponding to an event occurring within the communications network. The central controller analyzes the network interface message and, based upon the analysis of the network interface message, generates an action message that includes instructions to take an action on an affected network resource within the communications network. The action message is then transmitted to the appropriate network resource. The action message may cause the affected network resource to implement power management parameters for adjusting the power consumption of the network resource.

16 Claims, 4 Drawing Sheets

(56) References Cited

U.S. PATENT DOCUMENTS

2004/0225649 A1* 11/2004 Yeo et al. .......................... 707/3
2005/0208935 A1* 9/2005 Mountney et al. ......... 455/422.1
2007/0201488 A1* 8/2007 Jung ........................ 370/395.52
2009/0262675 A1* 10/2009 Tsai ............................. 370/311
2009/0296635 A1* 12/2009 Hui et al. ...................... 370/328

OTHER PUBLICATIONS

International Search Report dated Mar. 9, 2011 in PCT/US2011/021107.

* cited by examiner

REAL TIME EVENT-DRIVEN AUTOMATION FOR ENERGY MANAGEMENT IN A WIRELESS NETWORK

CROSS-REFERENCE TO RELATED APPLICATIONS

This application claims the benefit of provisional U.S. patent application No. 61/294,660, filed on Jan. 13, 2010, and entitled "Real Time Event Driven Automation for Energy Management in a Wireless Network", which is expressly incorporated herein by reference in its entirety.

BACKGROUND

One goal of wireless communications network operators is to reduce energy consumption of equipment within the network, thereby improving operating efficiency. Energy usage may be reduced within a wireless communications network by temporarily switching off hardware resources within the network when the resources are not being used. Traditional solutions typically switch network components on and off at specified times of day for all dates or for specific dates during a week. However, such solutions cannot respond in real time to service demands or associated operating activities as they occur in the wireless communications network.

It is with respect to these and other considerations that the disclosure made herein is presented.

SUMMARY

Technologies are described herein for real time event-driven automation of energy management features within a wireless communication network. In one embodiment, resources within a wireless communications network ("network resources"), such as base stations or a component within a base station supporting specific cells, sectors, frequency bands, or services, may be automatically switched on or off in response to events occurring within the wireless communications network. Network resources might also be placed in a standby mode of operation rather than switching the network resources off. These responses may occur in real time or in near real time.

As used herein, the term network resources means any hardware or software component within a wireless communications network. For instance, a network resource may be a base station or a component within a base station that provides one or more network services, such as voice services, data services, text services, and the like. By example and not limitation, a network resource might be a router, an antenna, a radio, a module configured to provide specific frequency bands, or any other component that provides a service within a wireless communications network.

According to aspects disclosed herein, a network resource within a wireless communications network may be turned off or placed in a standby mode of operation to conserve energy during periods of reduced usage of the resource. The resource might then be turned back on or returned to a regular mode of operation at an appropriate time. For instance, a network resource that provides network coverage within a particular cell that has been turned off may be automatically returned back to an operable state when events occurring within the network indicate the need to operate the resource. In addition to specific network resources that provide network coverage to a particular cell, entire base stations may be switched on and off. Similarly, some services of a network resource may remain on while services, such as frequency bands or specific services being provided by a network resource within a cell may be switched on or off to conserve energy. For example a network resource may continue to provide voice services within the cell, while data services are switched off.

According to other aspects disclosed herein, network interface messages associated with a wireless communications network may be analyzed to determine times for switching on and switching off network resources within the network to achieve desired levels of energy efficiency. For instance, decisions to switch network resources on or off or to place the resources in a standby mode of operation may be based on user information, mobile device capabilities, user location information, specific services requested, network traffic levels, performance-related events, experienced Quality of Service ("QoS"), latency, statistics, service loads, radio frequency magnitudes and other reported radio metrics, other factors related to the wireless network, and combinations thereof.

According to other aspects, a wireless communications network is disclosed that includes a controller that is configured to receive a network interface message corresponding to a network event occurring within the network. The network event may correspond to a mobile station establishing communications with a network resource, such as a base station, or other type of event. In response to receiving the message, the controller identifies an affected network resource with which the network event is associated, and determines network resource needs of the affected network resource based on information associated with the network event. Once the network resource needs are determined, the controller can determine power management parameters for the affected network resource and generate a power management action message configured to implement the power management parameters at the affected network resource. The controller transmits the power management action message to the affected network resource.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
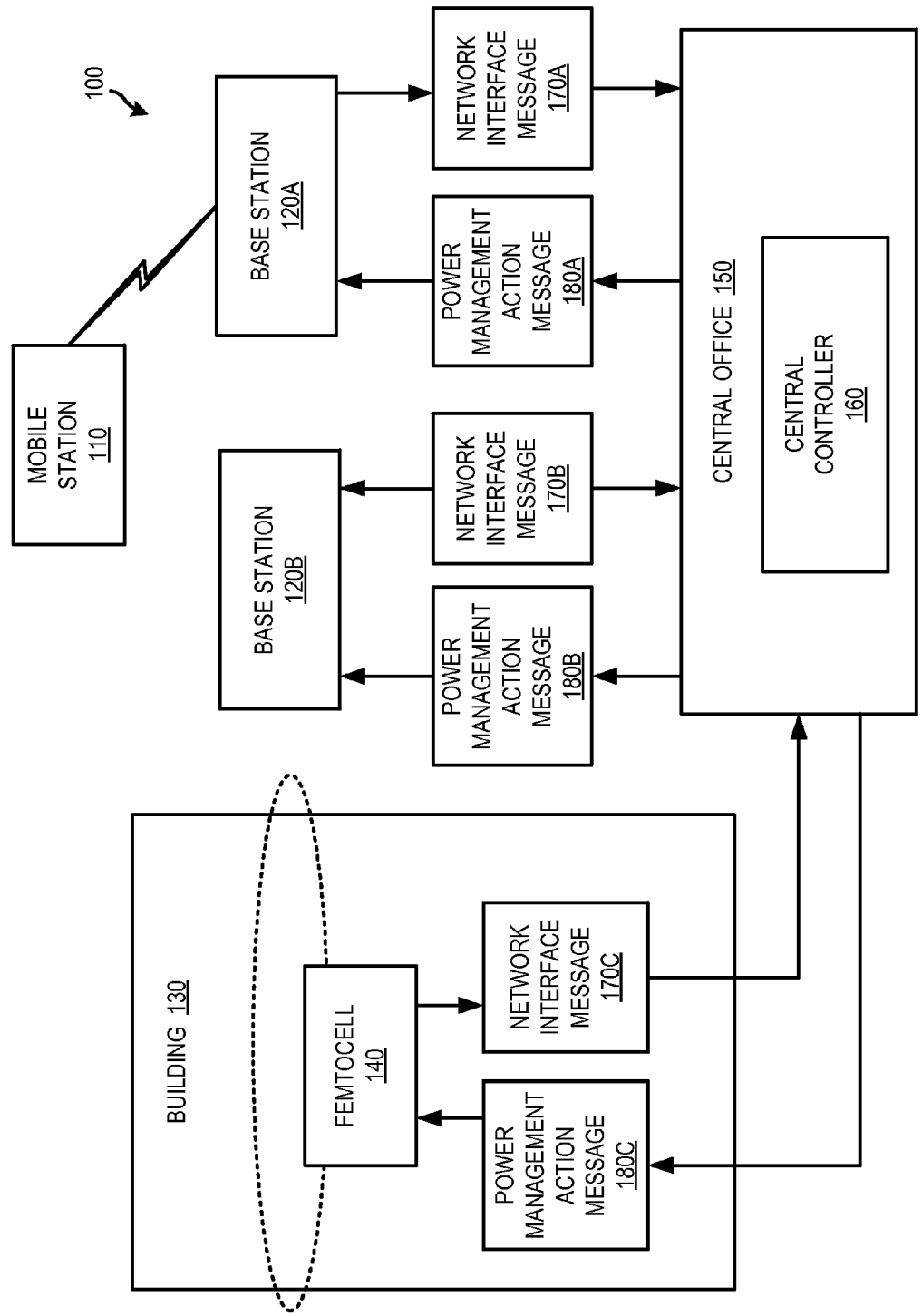
FIG. 1 is a block diagram illustrating aspects of a wireless communications network that implements aspects of the various embodiments presented herein.

The following description is directed to technologies for real time event-driven automation of energy management functionality in a wireless communications network. Through the use of the embodiments presented herein, network resources within a wireless communications network may be switched on and switched off in response to events occurring within the network. These event responses may occur in real time or in near real time. Events occurring in association with the wireless communications network may be identified based upon network interface messages used by the wireless communications network and other data. These messages may be communicated on interfaces used for traffic, payload, billing, authentication, authorization, or control information passed between base stations, central controllers, and other equipment within the wireless communications network.

While the subject matter described herein is presented in the general context of program modules that execute in conjunction with the execution of an operating system and application programs on a computer system or embedded processor-based system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for real time event-driven automation of energy management features within a wireless communications network will be described.

FIG. 1 is a block diagram illustrating a wireless communications network 100 that embodies aspects of the disclosure presented herein. The wireless communications network 100 may include base stations 120A and 120B, which are generally referred to herein as base stations 120. The base stations 120A and 120B might be referred to herein singularly or collectively as the base stations 120. As known to those skilled in the art, the base stations 120 generally provide wireless communication services within a specific area of the wireless communications network 100, such that various wireless and wired communications devices, like the mobile station 110, are able to communicate with one another within the wireless communications network 100.

The mobile station 110 is a communications device configured to operate within the wireless communications network 100. The mobile station 110 may be relatively stationary or it may move around or through the wireless communications network 100. Examples of the mobile station 110 may include a computing device such as a cell phone, a laptop, or any other mobile device that is capable of wirelessly communicating with other devices via the base stations 120.

The base station 120A may handle traffic associated with the mobile station 110. In some embodiments, a connection between the mobile station 110 and the base station 120A may be established such that the mobile station 110 may send and receive wireless communication traffic with other components of the wireless communications network 100 via the base station 120A. The mobile station 110 may be configured to utilize particular services offered by the base station 120A, such as voice services, data services, and the like. In addition, the base station 120A may be configured to provide different levels of voice and data services based on the type of mobile station 110 or the user operating the mobile station 110. For instance, a premium customer operating the mobile station 110 may be capable of using voice and data services over frequency bands offering better quality service, while a lower paying customer operating another mobile station may only be allowed to use voice and data services over frequency bands offering a lower quality service.

According to embodiments disclosed herein, the wireless communications network 100 is configured to provide functionality for managing the energy consumption of network resources operating within the network 100. Generally speaking, a network resource is any hardware or software component operating within the network 100. For example, a network resource may be a part of a base station 120 that provides one or more network services, such as voice services, data services, text services and the like. By example and not limitation, a network resource may be a router, an antenna, a radio, a module configured to provide specific frequency bands, or any other component that provides a service within the network 100. As will be described below, in an effort to make the wireless communications network 100 more energy efficient, some of the network resources within the wireless communications network 100 might be switched on or off based on events occurring within the wireless communications network 100. Additional details regarding this process will be provided below.

In general, network resources operating within the wireless communications network 100, such as the base stations 120, may communicate with a central office 150 using network interface messages 170A, 170B, 170C, which may be referred to herein singularly or collectively as network interface messages 170. The network interface message 170A may be generated by, or in association with, the base station 120A. Similarly, the network interface messages 170B and 170C may be generated by, or in association with base station 120B and the femtocell 140, respectively.

The network interface messages 170 may be generated in response to handling communication traffic associated with the mobile station 110 or in response to other operations performed within the network 100. For instance, the base station 120A may generate a network interface message 170A in response to determining that the mobile station 110 is attempting to connect to the base station 120A. The network interface message 170A may include information identifying the mobile station 110, such as device information, authentication information, user identification, and the like.

The network interface message 170A might also indicate service types or service requests associated with the mobile station 110. For example, service types may include voice service, text service, Internet access, data service, location service, or any other services provided to mobile stations, such as the mobile station 110, in association with the wireless communications network 100. The network interface message 170A might be communicated to and from the base station 120A to a central office 150, which may be configured to control the various network resources within the wireless communications network 100.

According to some embodiments, one or more of the base stations 120 generate network interface messages 170 in response to events occurring within the wireless communications network 100. For instance, when the mobile station 110 attempts to communicate with the base station 120A, or connects to the wireless communications network 100 via the base station 120A, the base station 120A generates a network interface message 170A in response to the network event corresponding to the mobile station 110 attempting to communicate with the base station 120A. The network interface messages 170 might be generated by other types of network resources in response to the occurrence of other types of events. For instance, and without limitation, network interface messages might be generated by base station controllers, voice switches, data switches, and other types of network resources. Events might include, without limitation, establishment of a call, a mobile station becoming proximate to a cell, a mobile station leaving a cell service area, the completion of a call, changes in call volume, dropping a call, the blocking of a call, changes in RF energy reported by the cell or mobile device, changes in operational parameters of the network, and other types of events. As will be discussed in greater detail below, network resources might also be switch on, off, or placed into a standby mode of operation in response to conditions other than the occurrence of events.

According to embodiments, when the network event is caused by a mobile station 110, information associated with the mobile station 110 may also be included in the network interface messages 170. This information may include user information, mobile device capabilities, user location information, RF magnitudes and other reported radio metrics, experienced QoS, radio access technology, service requests, traffic, traffic load, or any combination thereof.

The central office 150 is configured to control aspects of the operation of various network resources within the wireless communications network 100. A central controller 160 associated with the central office 150 might analyze the network interface messages 170 to determine information associated with the network event. For instance the central controller 160 might analyze a network interface message 170 received from the base station 120A to identify user information associated with the mobile station 110. The identified user information may then be used by the central controller 160 to determine power management parameters.

Power management parameters may be utilized to control the amount of power being provided to a particular network resource. For instance, the power management parameters may be configured to switch on or off specific network resources such that services provided by the network resources are switched on or off. Network resources might also be placed in a standby mode of operation rather than switching the network resources off. In one example, the power management parameters may switch off the operation of a network resource that provides data services to the mobile station 110 within the wireless communications network 100. As a result, data services to the mobile station 110 may no longer be available to the mobile station 110 until the particular network resource is switched on again.

The power management parameters may be applied to base stations 120, a femtocell 140, other network resources within the base stations 120, and other network resources. The power management parameters may be issued to one or more network resources, such as base stations 120A and 120B and the femtocell 140 as power management action messages 180A, 180B, 180C, respectively. The power management action messages 180A, 180A, 180C may be referred to herein singularly or collectively as the power management action messages 180.

The power management action messages 180 may include instructions for adjusting the power settings of a particular network resource. For example, a specific user or information about a user being within a specified group of users may cause the central controller 160 to determine that additional frequency bands, service types, or other services associated with the wireless communications network 100 be made available for that user. Accordingly, the power management action messages 180 may include instructions to cause a particular network resource to make additional frequency bands, services types or other services available for that user as determined by the central controller 160.

According to one or more other embodiments, the central controller 160 might determine from one or more network interface messages 170 that specific services are being requested by, or are available to, the mobile station 110. For example, the central controller 160 may determine that mobile station 110 may support third generation ("3G") wireless services while the base station 120A servicing mobile station 110 has 3G services switched off for power management purposes. In response thereto, the central controller 160 might issue a power management action message 180A to the base station 120A instructing the base station 120A to switch 3G services on to accommodate 3G operations for the to mobile station 110.

According to other embodiments, the central controller 160 is configured to analyze the network interface messages 170 to determine traffic patterns or other traffic parameters associated with the wireless communications network 100. Such traffic information may be used to automatically control energy saving functionality of not only the base station 120A, but other base stations such as base station 120B. For example, if traffic information derived from the network interface messages 170A received from the base station 120A indicate that the mobile station 110 is travelling towards the base station 120B, then the central controller 160 may issue power management action messages 180B to the base station 120B to switch on services at the base station 120B in preparation for communication with the mobile station 110. For example, if the base station 120B is currently in a switched off power saving mode, the base station 120B may be switched back on in order to communicate with the mobile station 110. In other examples, equipment or network resources that provide specific functionality within the base station 120A that are in a power saving mode of operation may be switched on to accommodate services for the mobile station 110 as the mobile station 110 arrives within a service area covered by the base station 120B. Generally speaking, specific functions of certain network resources may be switched on or off based on the needs of the network resource and the network in general as determined by the central controller 160.

In other embodiments, the mobile station 110 may maneuver within the wireless communications network 100 as to approach a building 130. A femtocell 140 might be deployed within the building 130. A femtocell 140 is a wireless network node deployed within a residential area or business to support service to a specific user or group of users. When there are no authorized users in the coverage area of the femtocell 140, the femtocell 140 can be switched off or into a power saving mode.

When a mobile station 110 enters or approaches the femtocell 140 coverage area, the femtocell 140 may be automatically switched back on or into an operational state. A neighboring base station 120 or other type of network resource might be utilized to detect the approaching mobile station 110. For instance, requested services by users belonging to one company operating within the building 130 may cause the femtocell 140 to generate the network interface messages 170C used by the central controller 160 to signal activation of the femtocell 140 servicing the company offices.

According to embodiments, the femtocell 140 may be configured to operate in association with a specific user, group of users, or specific service request. In a scenario where the mobile station 110 approaches the femtocell 140, thereby causing a network interface message 170C to be generated that identifies the user or requested service of the mobile station 110 as one affiliated with the femtocell 140, the central controller 160 may issue a power management action message 180C to the femtocell 140 that includes instructions to switch on the requisite network resources for providing network services to the mobile station 110.

It should be appreciated that the network interface message 170C might be generated by the femtocell 140 upon receiving a request from the mobile station 110 to establish a connection. In some embodiments, the mobile station 110 also sends a request to utilize a specific service, in which case the network interface message 170C generated by the femtocell 140 may include such information. Further, the network interface message 170C might also include identifying information associated with a user of the mobile station 110 and information identifying the magnitude of the RF signal received from the user's mobile station. This may be useful in circumstances where specific users have privileges to use certain services while other users may not have the requisite privileges.

It should be appreciated that the embodiments shown in FIG. 1 are examples only and that the technologies presented herein may be used in conjunction with various wireless communication network technologies in various combinations. The technology may be applied to mobile communication cells, wireless network operating zones, various granularities of operation within those, or any combination thereof. For example, a specific service or frequency band may be automatically placed into, and returned from, a power saving state or mode while other services or frequency bands of the same femtocell or node remain operational. For example, in some embodiments, a node may operate Second Generation ("2G") services while 3G services are switched off, or put into power saving mode, to conserve power in that node.

The technologies might also be applied to various other radio access technologies ("RATs") as well as technologies beyond 3G, such as long term evolution ("LTE") technology. It should be appreciated the technology presented herein may be applied to wireless network technology operating according to Global System for Mobile communications ("GSM"), code division multiples access ("CDMA"), wideband CDMA ("WCDMA"), High Speed Packet Access ("HSPA"), Wi-Fi, Worldwide Interoperability for Microwave Access ("WiMAX"), femtocells, Home Node B ("HNB") technology, Third Generation Partnership Project ("3GPP"), or any other wireless communication network standards, protocols, or technology.

It should also be appreciated that the wireless communications network 100 shown in FIG. 1 is merely illustrative and that the network 100 has been simplified for illustration purposes. For instance, while two base stations 120 and a single mobile station 110 have been illustrated in FIG. 1, many more such devices might be utilized. It should be appreciated that that many other components not illustrated in FIG. 1 might also be utilized.

Figure 2:
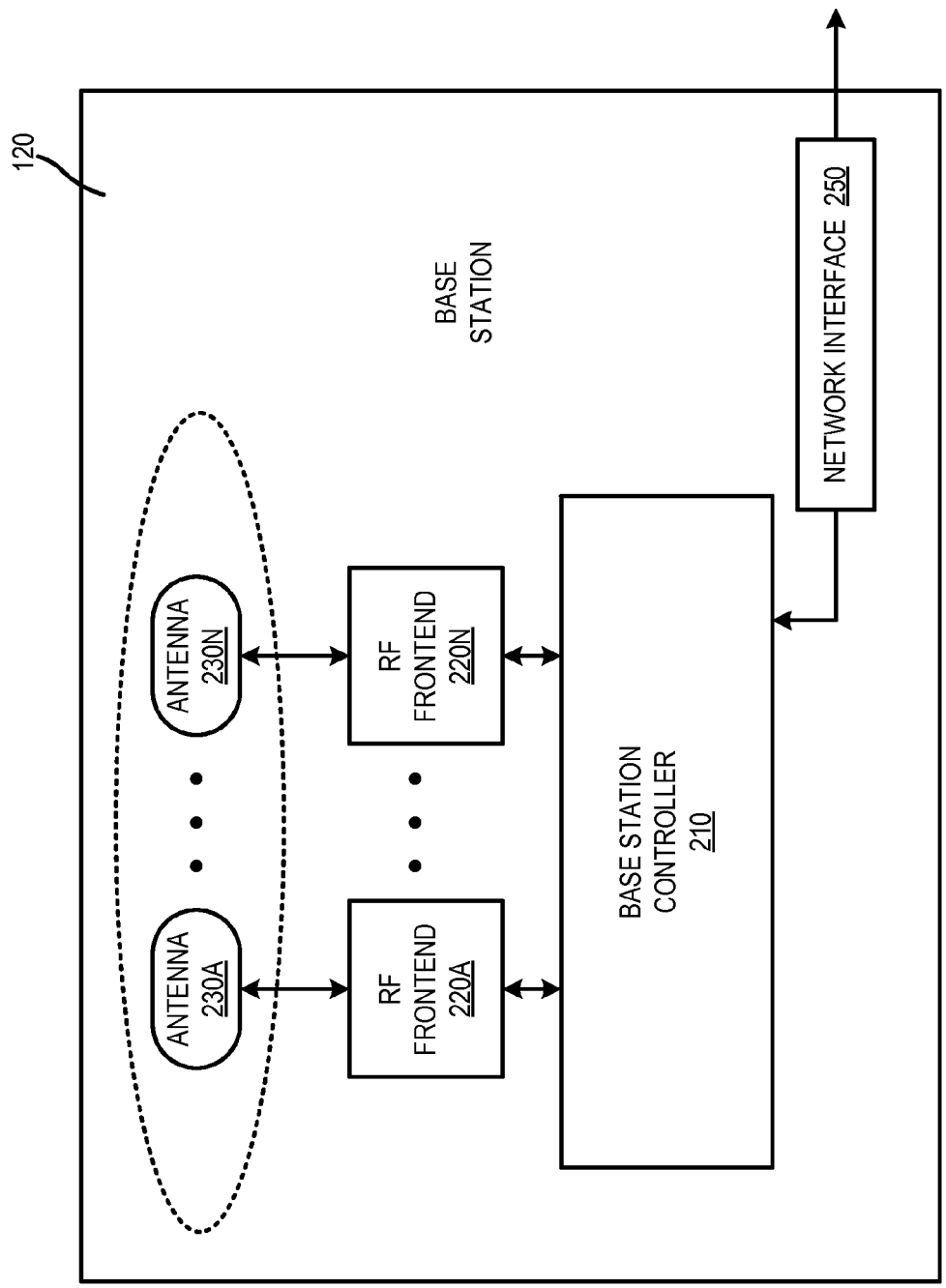
FIG. 2 is a block diagram illustrating aspects of a base station that implements aspects of the various embodiments presented herein.

Referring now to FIG. 2, additional aspects of a base station 120 that implements aspects of the various embodiments presented herein will be described. The base station 120 illustrated in FIG. 2, such as the base station 120A or the base station 120B, can include a base station controller 210. The base station controller 210 is a computerized control system based upon central processing units, microprocessors, microcontrollers, dedicated electronics, other processors, and/or other control circuitry. The base station controller 210 may receive and transmit wireless communications traffic through one or more radio frequency ("RF") frontends 220A-220N. The RF frontends 220A-220N may be referred to singularly or collectively as the RF frontends 220. An RF frontend 220 may receive and transmit wireless communications network traffic as RF energy using one or more antennas 230A-230N. The antennas 230A-230N may be referred to singularly or collectively as the antennas 230. The antennas 230 are utilized to communicate with the mobile station 110 by way of an appropriately configured antenna on the mobile station 110.

The base station controller 210 might also utilize a network interface 250. The network interface 250 may be a wired link or a wireless link such as a microwave point-to-point link. The network interface 250 may interface with another base station controller 210 associated with other base stations. The network interface 250 may also interface the base station controller 210 to the central office 150. The network interface 250 may support network interface messages 170 or power management action messages 180 transmitted between the base station 120 and the central office 150, between an femtocell 140 and the central office 150, or between any two resources of the wireless communications network 100.

According to some embodiments, the network interface messages 170 may be call detail records ("CDRs"). A CDR may be generated during a call or communication session. The CDR may also be generated at the start and/or at the end of a call. The CDR, or other types of network interface messages, may be used for authentication, authorization, billing, or other administrative purposes within the wireless communications network 100. The network interface messages 170 may be explicitly delivered to the central controller 160 or they may be collected using a network probe that traps messages on the network interface 250. The messages can provide information such as user, user location information, mobile station service capabilities, requested server, traffic, and so forth. It should be appreciated that the central controller 160 can analyze the network interface messages 170 in real time, or near real time, to provide rapid reactions to network events. Also, the central controller 160 can process, or analyze, the network interface messages with a delay once the messages are collected.

Figure 3:
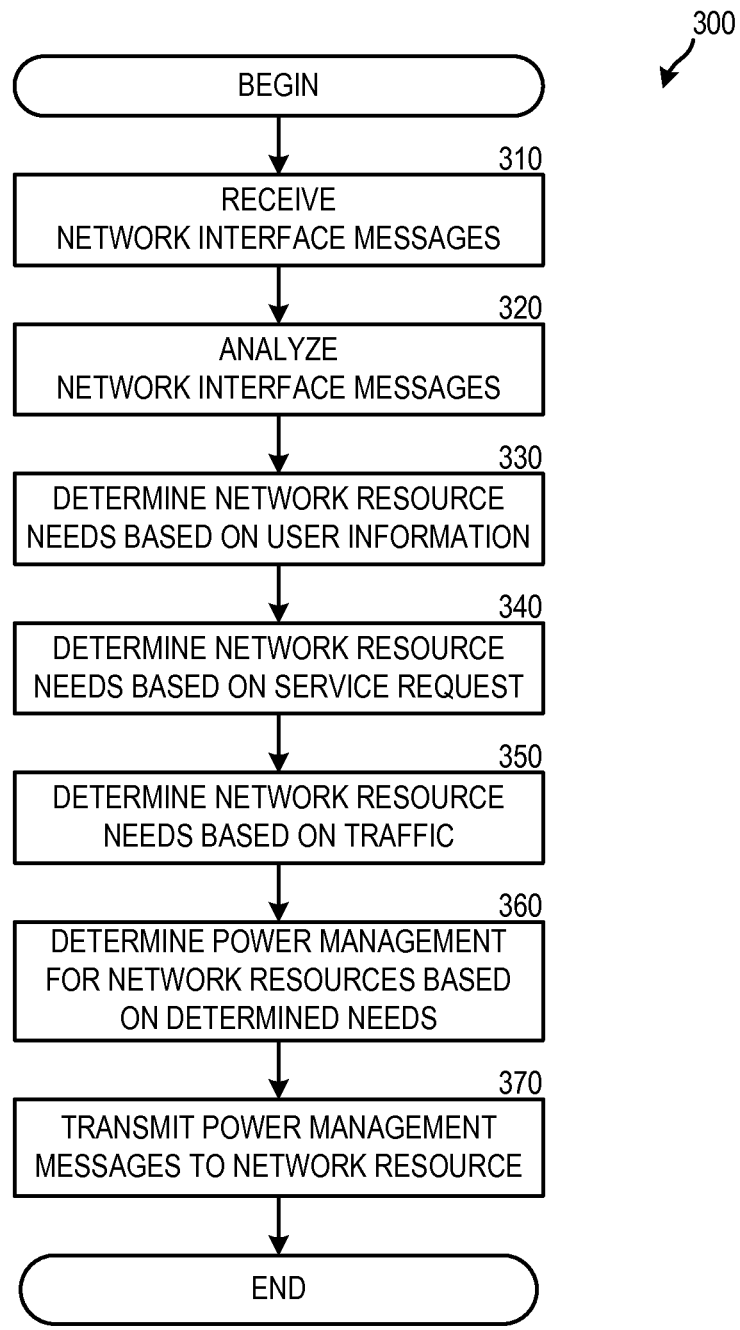
FIG. 3 is a logical flow diagram illustrating a process for real time event-driven automation of energy management functionality in a wireless communications network according to one or more embodiments presented herein.

Turning now to FIG. 3, additional details will be provided regarding the embodiments presented herein for energy management functionality in a wireless communications network. In particular, FIG. 3 is a flow diagram showing a routine 300 that illustrates aspects of a process for real time event-driven automation of energy management functionality in a wireless communications network 100 according to one or more embodiments presented herein.

It should be appreciated that the logical operations described herein with regard to FIG. 3 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules.

These operations, structural devices, acts and modules may be implemented in software, in firmware, in special purpose digital logic, or any combination thereof. It should also be appreciated that more or fewer operations may be performed than shown in the figures and described herein. These operations may also be performed in parallel, or in a different order than those described herein.

The routine 300 begins with operation 310 where network interface messages 170 are received. For instance, the network interface messages 170 may be received over the network interface 250. The network interface messages 170 may be received at a central controller 160 within a central office 150 over a network interface 250 from a base station controller 210. The network interface messages 170 may also be received from femtocell 140 or another type of network resource operating within the wireless communications network 100.

As discussed above, the network interface messages 170 may include information such as the identity of the network resource generating the network interface message 170, the network event that caused the wireless communications network 100 to generate the network interface message 170, and information associated with the network event, such as the type of network event. For example, if the network event is the sending of a service request from the mobile station 110 to the femtocell 140, the femtocell 140 may generate the network interface message 170C including information about the mobile station 110, the user of the mobile station 110, and information about the service request made by the mobile station 110.

The information about the service request made by the mobile station 110 may include the type of service, the quality of service, and the duration of service, amongst others. It should be appreciated that a network interface message may be transmitted by a network resource in response to an event occurring within the wireless communications network 100. Examples of a network event may include a request from a mobile station 110 to communicate with the wireless communications network 100 via a base station 120 or the mobile station 110 coming in proximity to the base station 120. Another example is increased network traffic being detected at a particular network resource, such as a femtocell.

At operation 320, the network interface messages 170 are analyzed at the central controller 160. The central controller 160 may analyze the network interface messages 170 received from femtocell 140, a base station 120, or other types of network resources operating within the wireless communications network 100. The analysis of the network interface messages 170 might also be performed at another network resource within the network 100.

The analysis may be based upon user information, mobile device capabilities, user location information, specific services requested, network traffic, service loads, or any combination thereof. The analysis may also include static system information such as network topology, network resource capabilities, network configurations, propagation environments, and so forth. The analysis might also include identifying one or more network resources that may be affected. For instance, if the network event that triggered the network interface message 170 is a request from a mobile station 110 to communicate with the wireless communications network 100 via a base station 120, the base station 120 may be identified as the affected network resource. Similarly, if the network event that triggers the network interface message is the detection of increased network traffic at a particular network resource, such as a femtocell 140, the affected network resource may include the femtocell 140 as well as other network resources proximate to the femtocell 140 that may be utilized to handle the increased network traffic.

At operation 330, network resource needs are determined based upon user information. Network resource needs are the needs of a network resource in order to satisfy the network interface message 170. The network interface messages 170 received at the central controller 160 may be analyzed as discussed with respect to operation 320 to determine network resource needs. This analysis may evaluate the specific user, type of user, or membership of user within a group associated with the network interface message being analyzed. According to some embodiments, the central controller 160 may respond more quickly or with more resources to specified class of users, such as users from a certain group, corporation, customer, or so forth. These responses may be associated with class-of-service, or quality-of-service agreements with certain customers or user classifications.

At operation 340, network resource needs are determined based on service requests. The central controller 160 analyzes the network interface messages as discussed with respect to 320 to determine network resource needs. This determination may be based upon a service request or a service type request communicated from the mobile station 110 using the network interface message received at operation 310. Examples of service requests may include services such as data access, Internet browsing, text messaging, voice communications, voicemail access, teleconferencing, paging, or any other communication service supported within the wireless communication network 100.

At operation 350, network resource needs are determined based upon traffic. The central controller 160 analyzes network interface messages as received in operation 310 to determine network resource needs. This analysis might be based on traffic patterns, offered traffic, traffic load, congestion, or other information associated with network traffic or network activity within the wireless communications network 100. For instance, the network resource needs may include the need for additional frequency bands or additional network resources, such as femtocells or nodes, to handle the increased traffic.

According to some embodiments, the central controller 160 makes resource determinations based upon an aggregation of events. For example, a resource, such as a femtocell 145 may be switched on in response to a specified level of traffic that justifies the addition of the resource. In this or other examples, the threshold for the critical mass may be a function of user class or user type, wherein fewer users of a higher class of service may be required to justify switching on a resource.

At operation 360, power management parameters for network resources are determined. The power management parameters may be determined based on the determined needs as established in operations 330, 340, and 350. The power management parameters may be based on user information, service request or service type, traffic, traffic load, or traffic patterns as determined from analyzing network interface messages as discussed with respect to operation 320.

Once the affected network resources are identified, the power management parameters for those network resources may be determined. In the event that more network resources need to be switched on due to increased traffic, the central controller 160 may be able to determine which network resources may be capable of satisfying the determined needs. Once those network resources that may be capable of satisfying the determined needs are determined, the central controller 160 may determine power management parameters for those network resources that may be capable of satisfying the determined needs.

It should be appreciated that resource power management techniques discussed herein may be based upon static network information such as frequency plans, coverage plans, equipment locations, network topology, propagation models, and other characteristics of the wireless communications network 100. The techniques may also be based upon traffic types, offered traffic quantity, traffic patterns, handoff patterns, energy consumption, energy costs, energy availability, or any other dynamic conditions within the wireless communications network. It should further be appreciated that the power management parameters may be determined in real-time or in near real-time.

At operation 370, power management action messages 180 may be generated by the central controller 160 and transmitted to base stations 120 or other network resources. The power management action messages 180 may include instructions for implementing the power management parameters determined at operation 360.

According to embodiments, once the base station 120 receives the power management action message 180, the base station 120 may either directly execute the power management action message 180 or may forward the power management action message 180 to an appropriate network resource. As described above, the power management action message 180 may include instructions for adjusting the power being provided to an affected network resource. The routine 300 may terminate after operation 370.

It should be appreciated that although the "affected network resource" has primarily been described herein as the network resource that has been switched on or off, other network resources might also be considered affected network resources. For instance, when a network resource has been turned off or placed in a standby mode of operation, messages from other network resources might be utilized to determine that the effected resource should be turned back on. In this example, the other network resources might also be considered affected network resources.

It should also be appreciated that, according to other implementations, network resources might also be switch on, off, or placed into a standby mode of operation based upon other types of information other than the occurrence of events. For instance, an analysis of performance of the wireless network 100 might be made based upon data collected by an operational support system ("OSS") operating in conjunction with the wireless network 100. Performance statistics might be generated based upon the OSS data and utilized to turn network elements on, off, or to place the network elements into a standby mode of operation. Other statistics describing the operation of the wireless network 110 might also be utilized to determine when to change the status of network resources.

Figure 4:
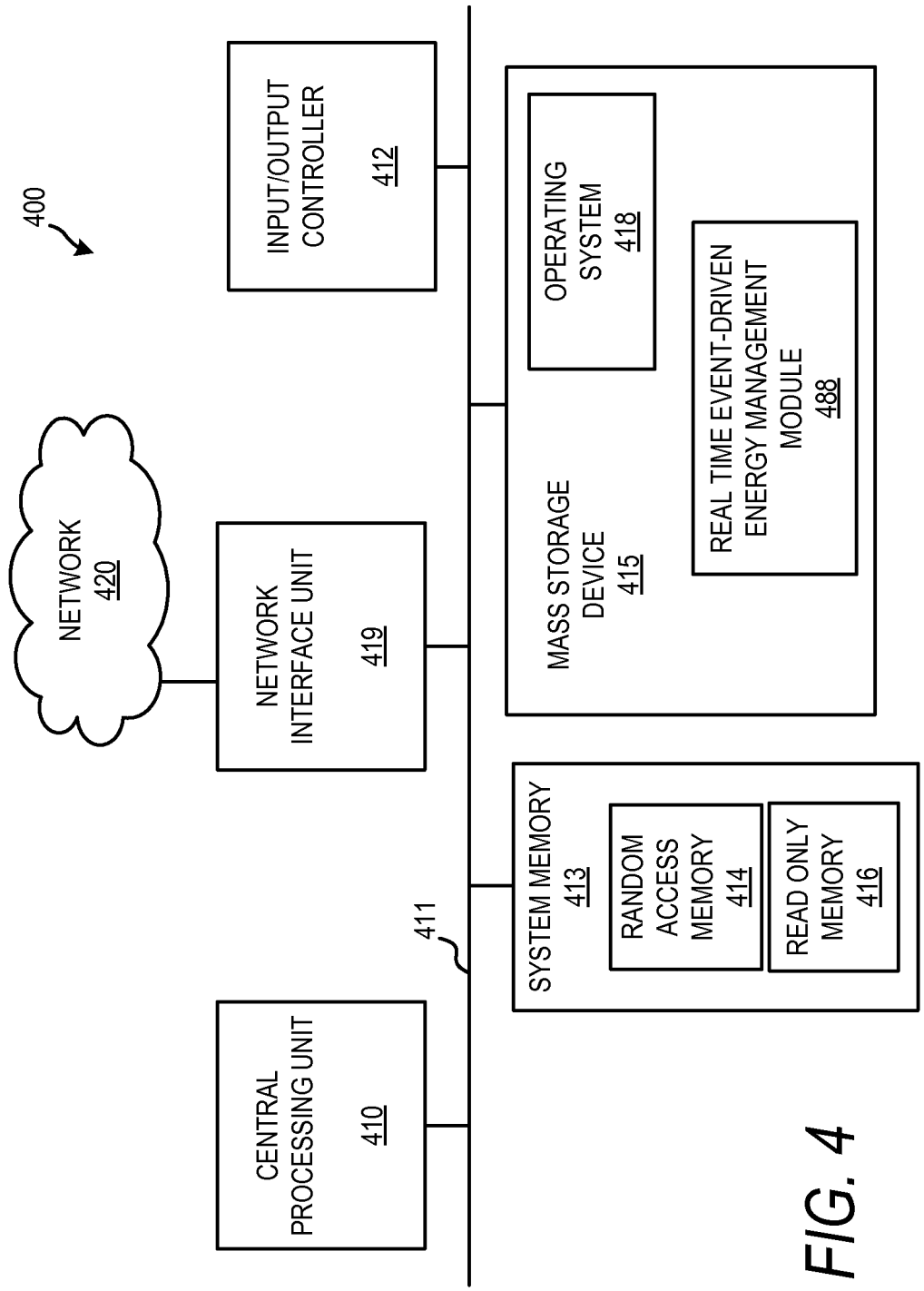
FIG. 4 is a computer architecture diagram illustrating aspects of a computing system capable of real time event-driven automation of energy management features within a wireless communications network according to one or more embodiments presented herein.

Turning now to FIG. 4, an illustrative computer architecture 400 will be described that can be utilized to execute software components for performing the processes described herein for real time event-driven automation of energy management functionality in a wireless communications network. The computer architecture shown in FIG. 4 illustrates an embedded control computer, a conventional desktop, a laptop, or a server computer and may be utilized to execute aspects of the software components presented herein. For example, the computer architecture 400 may serve as the central controller 160 or the base station controller 210. It should be appreciated that the described software components can also be executed on other example computing environments, such as mobile devices, television, set-top boxes, kiosks, vehicular information systems, mobile telephones, embedded systems, or otherwise.

The computer architecture illustrated in FIG. 4 can include a central processing unit 410 (CPU), a system memory 413, including a random access memory 414 (RAM) and a read-only memory 416 (ROM), and a system bus 411 that can couple the system memory 413 to the CPU 410. A basic input/output system containing the basic routines that help to transfer information between elements within the computer architecture 400, such as during startup, can be stored in the ROM 416. The computer architecture 400 may further include a mass storage device 415 for storing an operating system 418, software, data, and various program modules, such as a real time event driven energy management module 488.

The mass storage device 415 can be connected to the CPU 410 through a mass storage controller (not illustrated) connected to the bus 411. The mass storage device 415 and its associated computer-readable media can provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media that can be accessed by the computer architecture 400.

By way of example, and not limitation, computer-readable media may include volatile and non-volatile, removable and non-removable media implemented in any method or technology for the non-transitory storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 400.

According to various embodiments, the computer architecture 400 may operate in a networked environment using logical connections to remote computers through a network such as the network 420. The computer architecture 400 may connect to the network 420 through a network interface unit 419 connected to the bus 411. It should be appreciated that the network interface unit 419 may also be utilized to connect to other types of networks and remote computer systems. The computer architecture 400 may also include an input/output controller 412 for receiving and processing input from a number of other devices, including a keyboard, mouse, or electronic stylus (not illustrated). Similarly, an input/output controller 412 may provide output to a video display, a printer, or other type of output device (also not illustrated).

As mentioned briefly above, a number of program modules and data files may be stored in the mass storage device 415 and RAM 414 of the computer architecture 400, including an operating system 418 suitable for controlling the operation of a networked desktop, laptop, server computer, or other computing environment. The mass storage device 415, ROM 416, and RAM 414 may also store one or more program modules. In particular, the mass storage device 415, the ROM 416, and the RAM 414 may store the real time event driven energy management module 488 for execution by the CPU 410. The real time event driven energy management module 488 can include software components for implementing portions of the processes discussed in detail with respect to FIGS. 1-3.

The mass storage device 415, the ROM 416, and the RAM 414 may also store other types of program modules.

Software modules, such as the real time event driven energy management module 488 may be stored in the system memory 413, the mass storage device 415, or otherwise. The software modules may include software instructions that, when loaded into the CPU 410 and executed, transform a general-purpose computing system into a special-purpose computing system customized to facilitate all, or part of, the real time event driven energy management techniques disclosed herein. As detailed throughout this description, the program modules may provide various tools or techniques by which the computer architecture 400 may participate within the overall systems or operating environments using the components, logic flows, and/or data structures discussed herein.

The CPU 410 may be constructed from any number of transistors or other circuit elements, which may individually or collectively assume any number of states. More specifically, the CPU 410 may operate as a state machine or finite-state machine. Such a machine may be transformed to a second machine, or specific machine by loading executable instructions contained within the program modules. These computer-executable instructions may transform the CPU 410 by specifying how the CPU 410 transitions between states, thereby transforming the transistors or other circuit elements constituting the CPU 410 from a first machine to a second machine, wherein the second machine may be specifically configured to support real time event driven energy management. The states of either machine may also be transformed by receiving input from one or more user input devices associated with the input/output controller 412, the network interface unit 419, other peripherals, other interfaces, or one or more users or other actors. Either machine may also transform states, or various physical characteristics of various output devices such as printers, speakers, video displays, or otherwise.

Encoding of the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the system memory 413 when the software is encoded therein. For example, the software may transform the state of transistors, capacitors, or other discrete circuit elements constituting the system memory 413.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Based on the foregoing, it should be appreciated that technologies for real time event-driven energy management within a wireless communications network are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementation.

The subject matter described above is provided by way of illustration only and should not be construed as limiting. Various modifications and changes may be made to the subject matter described herein without following the example embodiments and applications illustrated and described, and without departing from the true spirit and scope of the present invention.

What is claimed is:

1. A controller configured to:
   receive a network interface message from a base station at a central office operative to control a network resource within a wireless communications network, the network interface message corresponding to a network event occurring within the wireless communications network;
   identify an affected network resource with which the network event is associated based on the network interface message;
   determine network resource needs of the affected network resource based on information associated with the network event;
   upon determining network resource needs of the affected network resource based on the information associated with the network event, determine power management parameters for the affected network resource based on the network resource needs of the affected network resource;
   upon determining power management parameters for the affected network resource, generate a power management action message configured to implement the power management parameters at the affected network resource, the power management action message comprising instructions to switch all or a portion of the affected network resource on, to switch all or a portion of the affected resource off, or to place all or a portion of the affected resource in a standby mode of operation;
   transmit the power management action message to the affected network resource;
   receive a second network interface message generated by a second base station indicating a mobile station is approaching a coverage area of the base station; and
   in response to the second network interface message, generate a second power management action message comprising instructions to switch all or a portion of the affected network resource on in preparation for communication with the mobile station.

2. The controller of claim 1, wherein the affected network resource is configured to:
   establish communications with a mobile station;
   upon establishing communications with the mobile station, receive the information associated with the network event;
   upon receiving the information associated with the network event, generate the network interface message corresponding to the network event;
   transmit the network interface message to the controller; and
   receive the power management action message generated by the controller.

3. The controller of claim 1, wherein the information associated with the network event comprises user information associated with the network event or a service request associated with the network event or based on traffic associated with the network event.

4. The controller of claim 1, wherein the power management action message comprises instructions to switch on or switch off a function of the affected network resource.

5. The controller of claim 1, wherein the controller is further configured to determine power management parameters for the affected network resource based on the network resource needs of the affected network resource in real time or near real time.

6. The controller of claim 1, wherein the affected network resource is a femtocell within the wireless communications network.

7. A computer-implemented method of energy management within a wireless communications network, comprising:
   receiving, at a computer system, a network interface message from a base station at a central office operative to control a network resource within a wireless communications network, the network interface message corresponding to a network event occurring within the communications network;
   identifying an affected network resource with which the network event is associated;
   determining network resource needs of the affected network resource based on information associated with the network event;
   upon determining network resource needs of the affected network resource based on the information associated with the network event, determining power management parameters for the affected network resource based on the network resource needs of the affected network resource;
   upon determining power management parameters for the affected network resource, generating a power management action message configured to implement the power management parameters at the affected network resource, the power management action message comprising instructions to switch all or a portion of the affected network resource on, to switch all or a portion of the affected resource off, or to place all or a portion of the affected resource in a standby mode of operation;
   transmitting, from a computer system, the power management action message to the affected network resource;
   receiving a second network interface message generated by a second base station indicating a mobile station is approaching a coverage area of the base station; and
   in response to the second network interface message, generating a second power management action message comprising instructions to switch all or a portion of the affected network resource on in preparation for communication with the mobile station.

8. The computer-implemented method of claim 7, wherein determining network resource needs of the affected network resource based on information associated with the network event comprises determining network resource needs associated with the affected network resource based on user information associated with the network event, a service request associated with the network event, or based on traffic associated with the network event.

9. The computer-implemented method of claim 8, wherein the affected network resource is a femtocell within the wireless network.

10. The computer-implemented method of claim 8, wherein the power management action message comprises instructions to switch on or switch off a frequency band of the affected network resource.

11. The computer-implemented method of claim 8, wherein the power management parameters for the affected network resource based on the network resource needs of the affected network resource are determined in real time or near real time.

12. The computer-implemented method of claim 8, wherein the network event comprises a user requesting use of a service associated with the affected network resource.

13. A non-transitory computer-readable medium having computer-executable instructions stored thereon which, when executed by a computer, cause the computer to:
   receive a network interface message from a base station at a central office operative to control a network resource within a wireless communications network, the network interface message corresponding to a network event occurring within a communications network;
   identify an affected network resource with which the network event is associated;
   determine network resource needs of the affected network resource based on information associated with the network event;
   upon determining network resource needs of the affected network resource based on the information associated with the network event, determine power management parameters for the affected network resource based on the network resource needs of the affected network resource;
   upon determining power management parameters for the affected network resource, generate a power management action message configured to implement the power management parameters at the affected network resource, the power management action message comprising instructions to switch all or a portion of the affected network resource on, to switch all or a portion of the affected resource off, or to place all or a portion of the affected resource in a standby mode of operation;
   transmit the power management action message to the affected network resource;
   receive a second network interface message generated by a second base station indicating a mobile station is approaching a coverage area of the base station; and
   in response to the second network interface message, generate a second power management action message comprising instructions to switch all or a portion of the affected network resource on in preparation for communication with the mobile station.

14. The non-transitory computer-readable medium of claim 13, wherein determining network resource needs of the affected network resource based on information associated with the network event comprises determining network resource needs associated with the affected network resource based on user information associated with the network event, a service request associated with the network event, or based on traffic associated with the network event.

15. The non-transitory computer-readable medium of claim 13, wherein the power management action message comprises instructions to switch on or switch off a function of the affected network resource.

16. The non-transitory computer-readable medium of claim 15, wherein the power management parameters for the affected network resource based on the network resource needs of the affected network resource are determined in real time or near real time.

* * * * *